(12) United States Patent
Okayasu

(10) Patent No.: US 6,454,051 B1
(45) Date of Patent: Sep. 24, 2002

(54) VIBRATORY COMPACTOR BEARING LUBRICATION

(75) Inventor: Akiyoshi Okayasu, Saitama-ken (JP)

(73) Assignee: Mikasa Sangyo Co., Ltd., Tokyo (JP)

( * ) Notice: Subject to any disclaimer, the term of this patent is extended or adjusted under 35 U.S.C. 154(b) by 42 days.

(21) Appl. No.: 09/705,028

(22) Filed: Nov. 2, 2000

(30) Foreign Application Priority Data

Nov. 19, 1999 (JP) .............................. 11-329001

(51) Int. Cl.[7] .............................. F01M 1/00; F01M 9/06; F16N 7/26; F16N 7/28
(52) U.S. Cl. .............................. 184/13.1; 74/87
(58) Field of Search .............................. 184/13.1, 11.1; 74/87

(56) References Cited

U.S. PATENT DOCUMENTS

| | | | | | |
|---|---|---|---|---|---|
| 2,008,296 A | * | 7/1935 | Soldan | .............. | 209/366 |
| 2,331,299 A | * | 10/1943 | Blom | .............. | 184/11.1 |
| 3,782,845 A | | 1/1974 | Briggs et al. | | |
| 4,113,403 A | * | 9/1978 | Tertinek et al. | .............. | 404/113 |
| 4,132,513 A | * | 1/1979 | Kulina | .............. | 418/151 |
| 4,568,218 A | * | 2/1986 | Orzal | .............. | 404/117 |
| 4,583,414 A | * | 4/1986 | Wadensten | .............. | 310/51 |
| 4,586,847 A | * | 5/1986 | Stanton | .............. | 172/40 |
| 4,926,970 A | * | 5/1990 | Kimberlin | .............. | 184/6 |
| 5,220,845 A | | 6/1993 | Anderson | | |
| 5,330,335 A | * | 7/1994 | Teracuhi et al. | .............. | 184/13.1 |
| 5,687,612 A | * | 11/1997 | Imamura | .............. | 464/16 |
| 5,735,676 A | * | 4/1998 | Loos | .............. | 184/104.1 |
| 5,904,427 A | * | 5/1999 | Braun et al. | .............. | 184/13.1 |
| 5,934,234 A | * | 8/1999 | Shichinohe et al. | .............. | 123/90.31 |
| 6,012,560 A | * | 1/2000 | Kuroda et al. | .............. | 192/35 |
| 6,135,241 A | * | 10/2000 | Ganguly et al. | .............. | 184/11.1 |

* cited by examiner

Primary Examiner—Christopher P. Schwartz
Assistant Examiner—Devon Kramer
(74) Attorney, Agent, or Firm—Frishauf, Holtz, Goodman & Chick, P.C.

(57) ABSTRACT

An oil lubricating system mounted on a vibrating plate compactor has a center chamber and outer chambers in the housing partitioned by a pair of bearings on the left and the right axially attached to the rotor shaft in the housing, and the oil in the housing is supplied not only to the center chamber but also to the outside chambers sufficiently by the rotation of the eccentric rotor to thereby impart uniform lubrication to the inner and the outer edges of the bearings for improving durability. As ameans to supply the oil from the center chamber to the outside chambers, hollow oil supply passages are provided on the left and the right rotor shafts axially mounted to the bearings to let the oil in the housing flow from the center chamber to the outer chambers.

4 Claims, 2 Drawing Sheets

VIBRATORY COMPACTOR BEARING LUBRICATION

BACKGROUND OF THE INVENTION AND RELATED ART STATEMENT

The present invention is related to a vibration generator of a vibrating plate compactor for compacting road surfaces, and more particularly to a bearing lubrication system of a vibration generator wherein lubricating oil stored inside may be supplied efficiently to the bearings of an eccentric rotor shaft.

A bearing lubrication system provided in the vibration generator for the vibrating plate compactor is known from such prior art as U.S. Pat. Nos. 3,782,845, 4,113,403, and 5,220,845 wherein the oil in an oil-bath type housing is stirred by vibrations caused by rotation of the eccentric rotor axially attached in a freely rotatable fashion inside the housing and turned into mists by diffusion caused by rotational wind pressure. The oil mist then attaches to the bearings of the rotor shaft exposed inside the housing and lubricates the shaft to facilitate rotation.

The oil mist attaches to the inner wall of the center chamber in the housing along the rotational direction of the eccentric rotor, flows toward bearings on the left and the right, and attaches to the inner edges of the bearings exposed on both sides of the center chamber inside the housing, thereby lubricating the bearings.

As mentioned above, the oil mist generating with rotation of the eccentric rotor in the housing in the conventional vibration generator attaches to the inner edges of the left and the right bearings exposed on both sides of the center chamber in the housing and lubricates the respective bearings, but the center chamber is not connected by a passage to the left and the right outer chambers and the bearings of the rotor shaft.

Therefore, the oil mist generated in the center chamber of the housing merely attaches to the inner edges of bearings exposed on both sides, does not flow toward the left and right outer chambers in the housing, and only an insufficient amount of the oil mist attaches to the outer edges of bearings in the outer chamber, thereby causing a state of insufficient lubrication.

The oil mist in the housing center chamber attaches to the inner edges of bearings exposed on both sides and enters the space between the ball rotating surface of the inner race and the outer race and that of the ball and the ball retainer. As the inner race and the balls are rotating at a high speed, the amount of oil mist flowing in the direction of the outer edge through the bearing is very much restricted.

With the amount of oil mist flowing in the direction of the outer edges through the bearing thus restricted, the inner edges of bearings inside the center chamber may be sufficiently lubricated, but not the outer edges of the same bearings in the outer chambers, thus generating high heat due to insufficient lubrication.

As a part of the bearing becomes very hot due to insufficient lubrication, the oil in the center chamber also becomes hot due to the heat of the bearing and the oil film required for lubrication decreases, causing wear by metallic friction to the bearings and eventually resulting in damage.

SUMMARY OF THE INVENTION

The present invention was contrived in view of the problems mentioned above in the oil lubricating system for a conventional vibration generator of a vibrating plate compactor. Rotation of an eccentric rotor is utilized to supply the oil not only to the housing center chamber but also to the outer chambers on the left and the right of bearings of the rotor shaft. The present invention therefore aims to impart optimum lubrication by supplying the oil to the inner and the outer edges of bearings and to extend their durability.

As a means to embody the present invention, an oil lubricating system of a vibration generator for lubricating the shaft of the eccentric rotor by diffusing the oil in the housing by rotating the eccentric rotor is provided with a rotor shaft supported by bearings in a freely rotatable fashion at both ends thereof in the housing, a center chamber and outer chambers partitioned by said bearings, and an oil supply passage along the axial direction on the left and the right shafts axially mounted on the bearings to let the oil in the center chamber flow toward the outer chambers.

According to a preferred embodiment of the present invention, said oil supply passage is so constructed that the top surface is below the centerline of the rotor shaft when the eccentric rotor is stationary, and the rotor shafts positioned at both ends of this top surface are provided with a hollow hole opened along the centerline of the rotor shaft.

Said oil supply passages should preferably be cone shaped with a smaller inner diameter on the center chamber side and the larger inner diameter on the outer chamber side. of the two oil supply passages in said rotor shaft, the passage provided on the rotor shaft on the side of a pulley to which the power is transmitted from outside is closed at its outer end by a closure means, but the portion inside the passage in front of the closure means and the outer chambers in the housing is open.

When providing an opening between the point in front of the closure means in the oil supply passage of the rotor shaft on the pulley side and the outer chamber in the housing, the opening should preferably be cone shaped with a larger inner diameter on the oil supply passage side and a smaller inner diameter on the outer chamber side.

According to another preferred embodiment of the present invention, the connecting part between the eccentric rotor and the rotor shaft is reinforced by parallel reinforcement walls connecting the inner edges of a rotor shaft and of another rotor shaft on the side of the top surface along the rotor shaft centerline when the eccentric rotor is stationary.

The oil lubrication system of vibration generator according to the present invention is provided with a center the housing, the outer chambers being partitioned by the left and the right bearings, and oil supply passages along the axial direction to let the oil in the center chamber flow toward the outer chambers. The oil diffused in the center chamber by rotation of the eccentric rotor not only lubricates the inside of the bearings in the center chamber but also flows into the outer chambers after passing through the oil supply passages on both sides of the rotor shaft from the top surface of the eccentric rotor to lubricate the outside of said bearings from the outer chambers. As a result, uneven lubrication of the bearings as in the prior art is corrected, and well-balanced lubrication of the center chamber and the outer chambers is facilitated, to thereby extend the durable life of the vibration generator.

DETAILED DESCRIPTION OF THE PREFERRED EMBODIMENT

Figure 1:
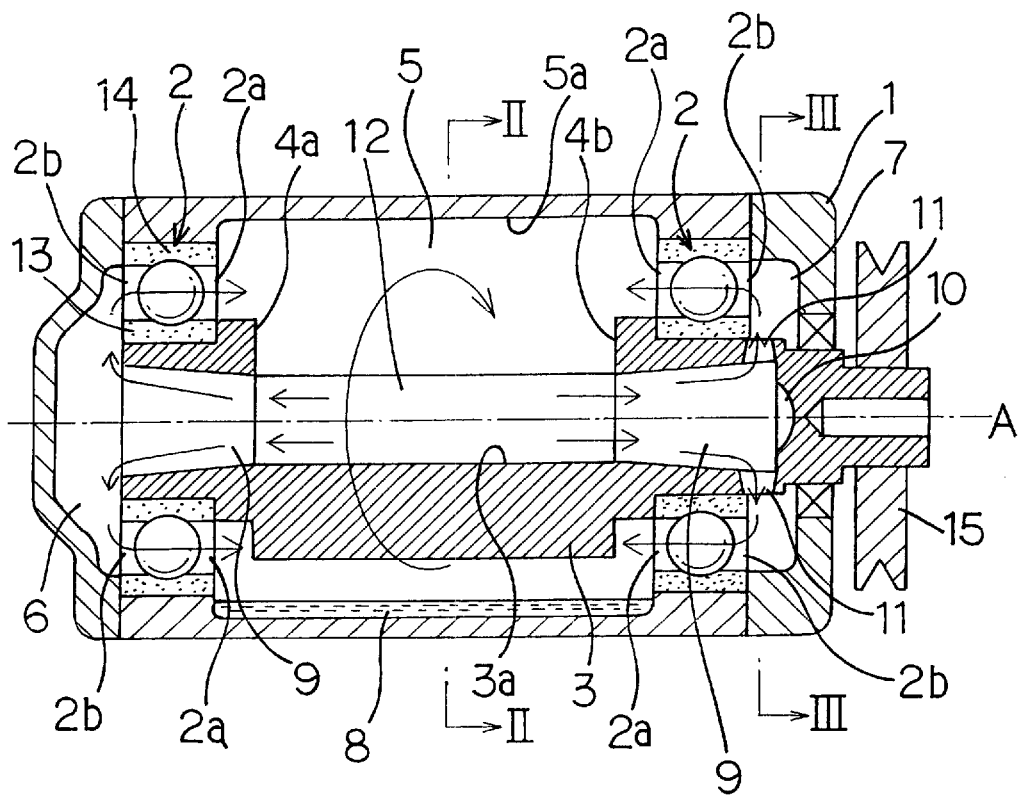
FIG. 1 is a cross sectional view of the oil lubrication system of the vibration generator according to the present invention.

The oil lubrication system of vibration generator according to the present invention is described in respect of a preferred embodiment shown in the attached drawing. The present vibration generator is mounted on a vibrating plate compactor (not shown), and comprises a housing 1, rotor shafts 4a, 4b axially attached to the housing 1 via bearings 2 on the left and the right in a freely rotatable fashion, and an eccentric rotor 3 provided between these two shafts.

At the end of the rotor shaft 4b protruding at one end of the housing 1 is provided a pulley 15 to which rotation from an engine of the vibrating plate compactor (not shown) is transmitted to said rotor shaft 4b.

The housing 1 is partitioned into a center chamber 5 between the two bearings 2 and the outer chambers 6, 7 on the outside of said bearings 2. The oil 8 stays on the bottom of the center chamber 5 and is diffused to the direction of the inner wall 5a of the center chamber 5 by the rotation of said eccentric rotor shaft 3.

The top surface 3a of the eccentric rotor 3 axially mounted on the bearings 2 inside the housing 1 is at a position lower than the centerline A of the rotor shafts 4a, 4b when the eccentric rotor 3 is stationary. On the rotor shafts 4a and 4b at both ends of the low top surface 3a is provided hollow oil supply passages 9 along the centerline A thereof to connect the center chamber 5 and the outer chambers 6, 7.

Said oil passage 9 is preferably hollow and connects the center chamber 5 and the outer chambers 6, 7. The cross section of the passage 9 along the longitudinal direction of the housing 1 is preferably cone shaped as shown in FIG. 1 where the inner diameter of the opening on the side of the center chamber 5 of the rotor shafts 4a, 4b is small and the inner diameter of the opening end on the side of the outer chamber 6, 7 is large.

Of the two rotor shafts, the shaft 4b on the side of a pulley 15, to which rotation from the engine is transmitted, is closed by a closure means 10 at the position where the outside of the hollow oil supply passage 9 is at the outer chamber 7 partitioned by the bearing 2. One or more openings 11 to connect the oil passage 9 and the outer chamber 7 are provided in front of the closure means 10.

Said openings 11 provided to the oil passage 9 of the rotor shaft 4b on the side of the pulley 15 should preferably have a cone shaped cross section along its longitudinal direction with a larger inner diameter on the side of the passage 9 and a smaller inner diameter on the side of the outer chamber 7.

Figure 2:
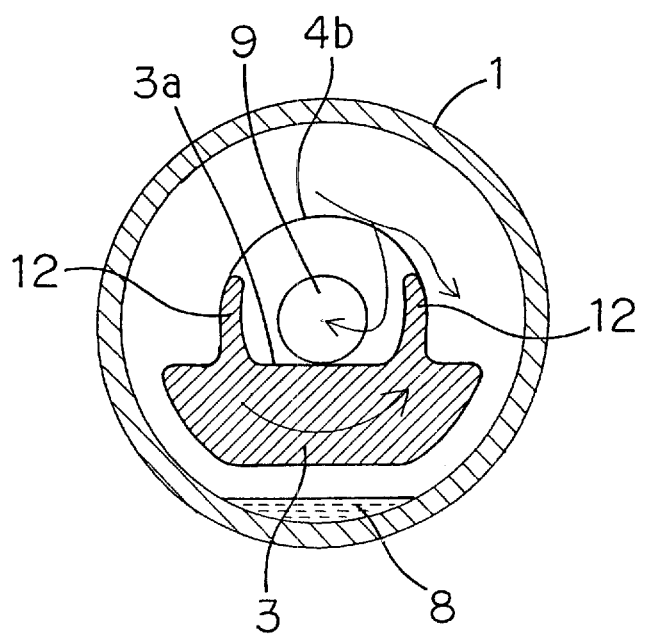
FIG. 2 is a cross sectional view along the line II—II in FIG. 1.
Figure 3:
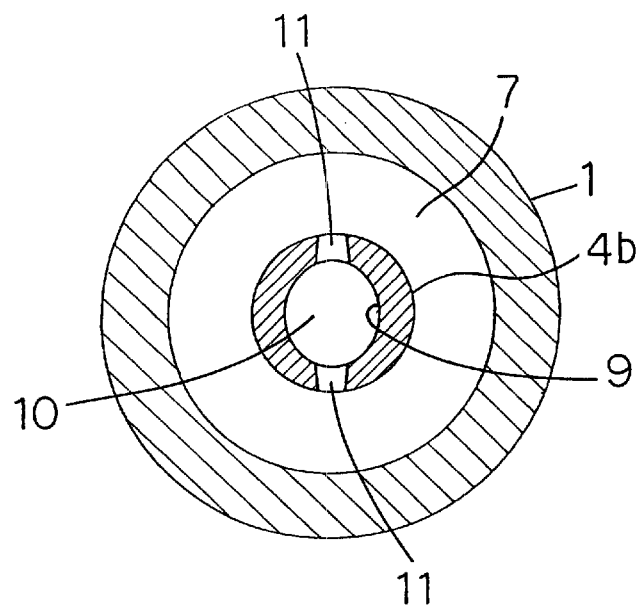
FIG. 3 is also a cross sectional view along the line III—III in FIG. 1.
Figure 4:
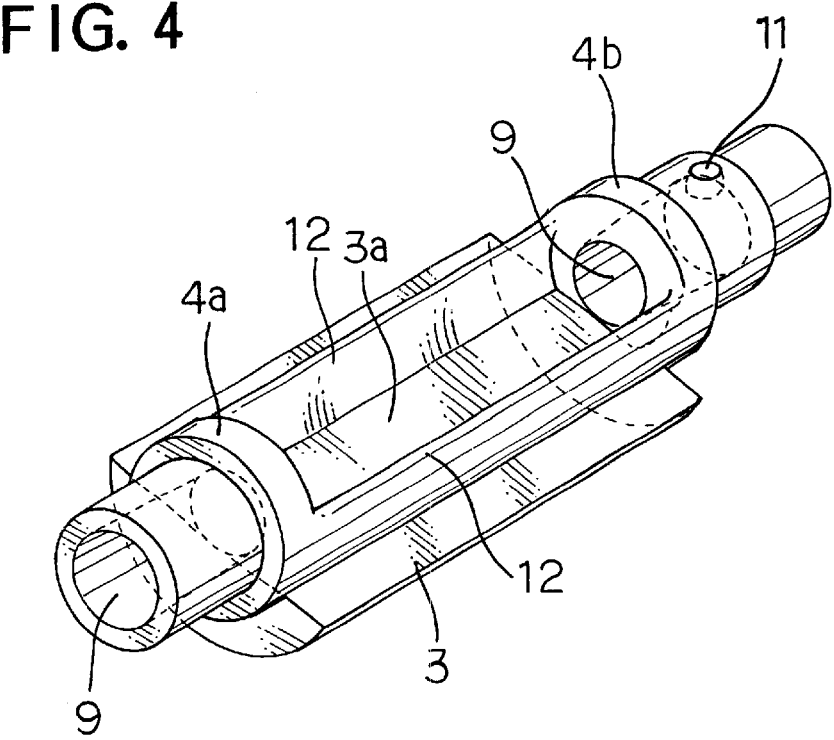
FIG. 4 is a perspective view showing the shape of an eccentric rotor.

As mentioned above, the top surface 3a of the eccentric rotor 3 is below the centerline A of the left and the right rotor shafts 4a and 4b when stationary and the rotor shafts 4a 4b are connected to both ends of the low top surface 3a, requiring quite a strong connection between the eccentric rotor 3 and the rotor shafts 4a, 4b. As shown in FIGS. 2 and 4, the connection is reinforced by a pair of parallel walls 12 on both sides of the top surface 3a in the axial direction of the eccentric rotor 3 so that a trough shaped space surrounded by a pair of the reinforcement walls 12 is created above the top surface 3a of the eccentric rotor 3.

In the above-mentioned embodiment, the top surface 3a of the eccentric rotor 3 is positioned below the centerline A of the left and the right rotor shafts 4a, 4b. The reason why the top surface 3a is placed low is to provide the hollow oil supply passages on the rotor shafts 4a, 4b with a shape as efficient as possible.

As described, the oil lubrication system according to the present invention comprises the center chamber 5 and the two outer chambers 6, 7 partitioned by a pair of bearings 2 on the left and the right in the housing 1, and the right and the left rotor shafts 4a, 4b of the eccentric rotor 3 axially mounted by said bearings inside the housing 1 in a rotatable fashion are provided with the hollow oil supply passages 9 leading to the top surface of the eccentric rotor 3 along the axial direction, so that the center chamber 5 and the outer chambers 6, 7 in the housing 1 are connected by the oil passage 9 of the rotor shafts 4a, 4b.

When the eccentric rotor 3 rotates in the center chamber 5 of the housing 1, the oil diffused inside the center chamber 5 lubricates the inner edges 2a of the bearings 2 exposed in the center chamber 5 and flows from the top surface 3a of the eccentric rotor 3 toward the outer chambers 6, 7 passing through the oil passages 9 of the rotor shafts 4a, 4b, and diffuses within the outer chambers 6, 7, thereby lubricating the outer edges 2b of the bearings 2 as shown by the arrows.

Of the rotor shafts mentioned above, the shaft 4b on the pulley side is provided with a closure means 10 on the outside of the oil passage 9. This shaft 4b has a plurality of openings 11 connecting the oil passage 9 in front of the closure means 10 and the outer chamber 7, so that the rotor shaft 4b on the pulley side having a closure means 10 in between can supply the oil 8 from the center chamber 5 through the openings 11 to the outer chamber 7.

The hollow oil passage 9 at the rotor shafts 4a, 4b has a cone shaped cross section with a smaller inner diameter of the opening on the side of the center chamber 5, and a larger diameter of the outer chambers 6, 7 to facilitate moving and diffusing the oil adhering to the passages 9 toward the outer chambers 6, 7 by the rotational centrifugal force of the rotor shafts 4a, 4b.

As the oil 8 flows from the top surface of the eccentric rotor 3 toward the oil passage 9 of the rotor shafts 4a, 4b, the oil moves along the inner wall surface toward the outer chambers 6, 7 having a larger inner diameter while adhering to the wall of the passage 9. At this time, the oil flows toward the outer chambers 6, 7 by depriving the heat of the inner race 13 of the bearing 2 as well as the heat generated at the contacting surfaces of the inner race 13 and the rotor shafts 4a, 4b.

At the rotor shaft 4a without pulley shown on the left side of FIG. 1, the oil moves inside the passage 9 and flows into the outer chamber 6 from the shaft end. The oil then diffuses toward the direction of the outer edge 2b of the bearing 2 by the centrifugal force. At the rotor shaft 4b provided with the pulley 15 on the right side, the oil moves inside the passage 9 and flows into the outer chamber 7 by passing through the opening 11 provided at the shaft end, and flows further toward the outer edge 2b of the bearing 2 by the centrifugal force.

As the oil in the center chamber 5 is sent to the outer chambers 6, 7 through the oil passages 9 of the rotor shafts 4a, 4b, the bearings 2 receive the oil from the inner edges 2a 4a, 4b exposed in the center chamber 5 as well as from the outer edges 2a exposed in the outer chambers 6, 7. In this state, the oil advances onto the ball-rolling surface between the inner race 13 and the outer race 14 of the bearings 2 and evenly lubricates the bearings from the inside and the outside, and extends the durability by a great degree.

As shown in the embodiment as above constructed, the top surface 3a of the eccentric rotor 3 is positioned below the centerline A of the rotor shafts 4a, 4b and a pair of parallel reinforcement walls 12 are provided on both sides of the top surface 3a of the eccentric rotor 3, creating a trough shaped space above the top surface 3a of the eccentric rotor 3 as shown in FIG. 2. With this construction, the oil is not merely diffused toward the wall 5a of the center chamber but is trapped inside the trough shaped space efficiently at the top surface 3a of the eccentric rotor 3 to be supplied in the direction of the outer chambers 6, 7 from the oil passages 9.

According to the oil lubrication system of the present invention, the oil near the rotor shafts 4a, 4b which had not functioned at all properly as the lubricant for the bearings 2 can be sent to the outer chambers 6, 7 beyond the bearings 2 via the oil passages 9 so that the oil sealed inside the housing 1 can be uniformly diffused over the bearings without increasing the amount or wasting it.

Compared to conventional type lubrication systems, the present lubrication system is characterized in that the oil passages 9 are provided at the rotor shafts 4a, 4b, the shaft weight can be reduced, the inertia on the rotor shafts due to vibration is decreased, and the load in the circumferential direction of the bearing is also decreased to thereby radically lower the oil temperature and heat generation at the bearings.

What is claimed is:

1. An oil lubricating system for a vibration generator, wherein the vibration generator comprises a housing, first and second rotor shafts provided in the housing and respectively supported on first and second bearings in a freely rotatable fashion, an eccentric rotor provided on the rotor shafts, a center chamber provided in the housing, first and second outer chambers provided in the housing and respectively partitioned by the first and second bearings, and a pulley which is provided on one of the first and second rotor shafts and to which power is transmitted from an outside source, said oil lubricating system comprising:

an oil supply passage provided along an axial direction of the rotor shafts to connect the center chamber and the first and second outer chambers and enable oil in the center chamber to flow toward the first and second outer chambers;

a closure member closing the oil supply passage at an outer end thereof on a side of the one of said first and second rotor shafts at which the pulley is provided; and an opening connecting the oil supply passage in front of the closure member with the pulley side one of said first and second outer chambers;

wherein the oil supply passage on the pulley side and the opening connecting the oil supply passage with the pulley side one of said first and second outer chambers have cone shaped cross sections in a longitudinal direction with a larger inner diameter at an oil supply passage side end and a smaller diameter at an outer chamber side end.

2. The oil lubricating system as claimed in claim 1, wherein the oil supply passage comprises a top surface of the eccentric rotor which is positioned below a centerline of the rotor shafts when the eccentric rotor is stationary, and a hollow opening bored along the centerline of the rotor shafts at both ends of the top surface of the eccentric rotor.

3. An oil lubricating system for a vibration generator, wherein the vibration generator comprises a housing, first and second rotor shafts provided in the housing and respectively supported on first and second bearings in a freely rotatable fashion, an eccentric rotor provided on the rotor shafts, a center chamber provided in the housing, and first and second outer chambers provided in the housing and respectively partitioned by the first and second bearings, said oil lubricating system comprising:

an oil supply passage provided along an axial direction of the rotor shafts to connect the center chamber and the first and second outer chambers and enable oil in the center chamber to flow toward the first and second outer chambers; and parallel reinforcement walls provided to reinforce a connection between the eccentric rotor and the rotor shafts and to connect inner ends of the rotor shafts above a top surface of the eccentric rotor;

wherein the top surface of the eccentric rotor is below a centerline of the rotor shafts when the eccentric rotor is stationary.

4. The oil lubricating system as claimed in claim 3, wherein the oil supply passage has a cone shaped cross section in a longitudinal direction with a smaller inner diameter at a center chamber side end and a larger diameter at an outer chamber side end.

* * * * *